United States Patent [19]

Runge et al.

[11] Patent Number: 5,383,824
[45] Date of Patent: Jan. 24, 1995

[54] PROCESS FOR CONTROLLING THE TORQUE OF AN INTERNAL COMBUSTION ENGINE

[75] Inventors: Wolfgang Runge; Hans-Dieter Hengstler, both of Ravensburg, Germany

[73] Assignee: Zahnradfabrik Friedrichshafen AG, Germany

[21] Appl. No.: 64,036

[22] PCT Filed: Nov. 18, 1991

[86] PCT No.: PCT/EP91/02167

§ 371 Date: May 19, 1993

§ 102(e) Date: May 19, 1993

[87] PCT Pub. No.: WO92/09449

PCT Pub. Date: Jun. 11, 1992

[30] Foreign Application Priority Data

Nov. 22, 1990 [DE] Germany .................. 4037092

[51] Int. Cl.$^6$ ............................................. B60K 41/04
[52] U.S. Cl. .................................... 477/110; 477/107
[58] Field of Search ............... 123/399, 477, 480; 74/857, 859, 856, 861; 477/107, 110

[56] References Cited

U.S. PATENT DOCUMENTS

| | | | |
|---|---|---|---|
| 4,564,906 | 1/1986 | Stephan et al. | 74/844 |
| 4,682,667 | 7/1987 | Hosaka . | |
| 4,945,481 | 7/1990 | Iwatsuki et al. . | |
| 5,019,810 | 5/1991 | Ito et al. . | |
| 5,029,492 | 7/1991 | Kiuchi | 74/844 |
| 5,052,246 | 10/1991 | Yamaguchi | 74/878 X |
| 5,117,791 | 6/1992 | Chan et al. | 123/399 X |
| 5,131,293 | 7/1992 | Kaiser et al. | 74/844 |

FOREIGN PATENT DOCUMENTS

| | | |
|---|---|---|
| 3841400 | 7/1989 | Germany . |
| 2935916 | 12/1989 | Germany . |
| 3830938 | 4/1990 | Germany . |

Primary Examiner—John T. Kwon
Assistant Examiner—Hoang Nguyen
Attorney, Agent, or Firm—Davis, Bujold & Streck

[57] ABSTRACT

In a process for controlling the torque of an internal combustion engine, an automatic gear system driven by the internal combustion engine includes a gear control device (1) and the internal combustion engine has a control device which, based on speed, load and, where appropriate, temperature signals, controls an ignition angle of an ignition system and/or an injection pulse width of a fuel injection system. The gear control device (1), for its part, controls on the basis of speed and load requirement signals the gear changes of the automatic gear. To improve the control of the whole drive unit, for the purpose of reducing fuel consumption and having smooth gear changes, the computer systems of the gear control drive (1) and of the control (2) of the internal combustion engine constantly intercommunicate via interfaces (3), the control device (2) of the internal combustion engine receiving from the gear control (1), in a cyclic time beat, a percentage torque requirement (PLF) on the basis of which the control device (2) automatically influences the torque of the internal combustion engine.

8 Claims, 3 Drawing Sheets

PROCESS FOR CONTROLLING THE TORQUE OF AN INTERNAL COMBUSTION ENGINE

This application is filed under rule 35 USC 371 and is a continuation application of PCT/EP91/02167 filed Nov. 18, 1991.

The invention concerns a process for controlling the torque of an internal combustion engine which drives a motor vehicle via an automatic gear system, including a control device for the internal combustion engine, which based on speed, load and, where appropriate, temperature signals, controls an ignition angle of an ignition system and/or an injection pulse width of a fuel injection system and a gear control device for the automatic gear system which, based on speed and load requirement signals, controls gear changes of the automatic gear system.

A process for control of the torque of an internal combustion engine of the above kind has been disclosed in DE-C 29 35 916. According to said publication, a jolt occurring during the gear change of the automatic gear system is to be reduced by reducing the torque of the internal combustion engine during the gear change. By virtue of the reduced torque of the internal combustion engine during the course of the change, the grinding period of the friction clutches of the automatic gear system that take part in the gear change can also be reduced together with a reduction of the jolt so that there is less wear and less heating of the friction elements. The control device for the internal combustion engine is equipped with an identification circuit which, during a gear change, receives a switch signal from the gear control. Performance graphs, according to which the ignition angle and/or the injection pulse width are controlled according to load and speed, are deposited in a memory of the control device for the internal combustion engine. If a switch signal is fed to the identification circuit of the control device of the internal combustion engine, the control device automatically switches over to another performance graph in which the torque of the internal combustion engine is reduced by an adjustment of the ignition angle to a "late" direction or a reduction of the amount of the fuel injected. Problems are created here by the exact determination of the moment of reducing the torque. Besides, such a storage of different performance graphs and a switch over of performance graphs are relatively expensive. It is finally to be concluded that in modern drive concepts such a control of the drive torque of the internal combustion engine only on the basis of switch signals of the gear control is not sufficient, especially since the torque transmitted by the internal combustion engine to the automatic gear system also has a great importance for the travel behavior of the motor vehicle and affects the fuel consumption.

Therefore, the problem to be solved by this invention is to provide a process for controlling an internal combustion engine where the torque of the internal combustion engine can always be adjusted to a favorable value, even at low control cost.

In a process of the kind mentioned, said problem is solved according to the invention by the fact that computer systems of the gear and engine control constantly communicate, via interfaces, wherein the control device of the internal combustion engine receives from the gear control device, in a cyclic time beat, a percentage torque requirement on the basis of which the control device of the internal combustion engine automatically affects the torque of the internal combustion engine. According to the process of the invention, a de-central microprocessor system is used in which, via serial or parallel interfaces, the individual microprocessors of the control unit of the internal combustion engine and of the gear system control device exchange data. Through the interfaces, the actual data of the gear control device and corresponding requirements are always passed on to the control device for the internal combustion engine which can thereby adapt, in an ideal manner, to the gear control unit. Thus, the gear control unit can always transmit to the control device of the internal combustion engine, in the cyclic time beat, a desired reduction or increase of torque with the aid of percentage values.

According to the invention, in case of a change of torque detected by the gear control, the percentage torque requirement issued via the interface must be reduced or increased according to a gradient. According to the invention, the gradient can be determined as a function from a set value of the torque requirement, a variable factor of the torque requirement and a load signal:

$$d_{PLF} = f(PLF2, PLF, \text{load})$$

In addition, it is provided by the invention that in a change of torque produced by a gear change, the variable factor of the torque requirement is issued from the first engagement or disengagement by friction elements participating in the gear change.

According to the invention, the reduction or increase must continue up to a final set value of the torque requirement, the final set value, adapted to a specific mode of travel, being computed from the variable factor minus the product of variable factor and a weighing factor which, for its part, is a function of the load requirements and speeds, that is: $PLF2 = PLF \pm PLF \times Fak(T)$, wherein $Fak(T) = f(n_1, n_2, \text{load})$.

According to the invention, the gear control must detect reduced torque requirements in the drive train which appear as a result of wheel slippage of the drive wheels of the motor vehicle. Thus, together with reduced torque requirements of the shift clutches of the automatic gear system which appear in slip conditions, reduced torque requirements, caused by wheel slippage of the drive wheels of the motor vehicle, can also be detected. A separate drive-slip adjustment device consequently can be omitted.

According to the invention, during an overlapping switch of two friction elements the engine torque must be peaked, for a short time, by an increased torque requirement so that a drop of output torque occurring during said overlapping switch can be compensated. In an overlapping switch of two friction clutches or brakes of the automatic gear system, which occurs without interruption of traction with an increasing clutch torque of one friction clutch and decreasing clutch torque of the other, the output torque is briefly reduced in the area of the overlapping switching. According to the invention, said reduction of the output torque is to be compensated by an increased torque of the internal combustion engine wherein the torque can briefly exceed the maximum value. Such a brief peaking of the torque of the internal combustion engine is preferably to be obtained by an enlarged injection pulse width of the fuel injection system.

Finally, according to the invention, the gear control instrument must detect, together with the percentage torque requirement as a first correcting variable, a clutch pressure of the switch elements, as a second correcting variable, whereby the output torque of the gear system and the grinding periods of the switch elements must be independently controllable based on both correcting variables.

In the prior art, the torque is reduced by a constant percentage-value by a change over in performance graph of the control device of the internal combustion engine. The disadvantage of this is that only the clutch pressure is available as a correcting variable in order to influence both output variables (adjusting variables) output torque and grinding periods. Thus, it can happen, for instance, that the course of the output torque is favorable but the grinding period is too short.

If in accordance with this invention, the percentage torque requirement PLF, which can be constantly adjusted during the gearshift by the gear control instrument, is introduced, then there are instead two variables, namely, the clutch pressure and the torque requirement PLF to be able to influence both output variables, output torque and grinding period, independently of each other. If the clutch pressure must be increased, for instance, in order to increase the output torque, then there can be obtained, by simultaneous increase of the percentage torque requirement PLF, that the grinding period remains constant. There applies $$T_K = K_K \cdot p_K,$$

wherein
$K_K$ = clutch constant
$P_K$ = clutch pressure
$T_K$ = clutch torque $$T_1 = T_{M100} \cdot PLF,$$

wherein
$T_{M100}$ = torque of the internal combustion engine (100% value)
PLF = percentage torque requirement $0 < PLF < 1$ During an upshift, the gear system input speed $n_1$ is lowered by means of the adequately connected clutch to the synchronous speed $n_{syn}$ of the new gear: $\dot{n}_1 = dn_1/dt$.

This lowering of the speed of the gear input shaft to the synchronous speed $n_{syn}$ takes place with a specific gradient $\dot{n}_1$ within a certain period of time $t_s$ (grinding period). The output torque $T_{ab}$ results from the clutch torque $T_k$ and a gear ratio I:

$$T_{ab} = i \cdot T_K$$

There also applies:

$$I_1 \cdot \dot{n}_1 = T_1 - T_K \text{ (torque balance)}$$

Here
$I_1$ = moment of inertia on the input shaft
$\dot{n}_1$ = gradient for the speed change of the input shaft
$T_1$ = input torque on the input shaft
There also applies $$t_s = \frac{\Delta n}{(\dot{n}_1)} = \frac{\Delta n \cdot I_1}{T_1 - T_K}$$

Essential characteristic variables (output variables) are: Output torque $T_{ab}$ (essentially responsible for the switch quality):

$$T_{ab} = i \cdot K_K \cdot p_K$$

Grinding period $t_s$ (essential for clutch load):

$$t_s = \frac{n \cdot I_1}{(T_{M100} \cdot PLF - K_{IC} \cdot P_K)}$$

The invention is not limited to the combination of features of the claims. Other logical possible combinations of the claims and the individual features of the claims result from the existing problem.

For a further explanation of the invention, reference is had to the drawings where operation of the process according to the invention is shown. In the drawings.

Figure 1:
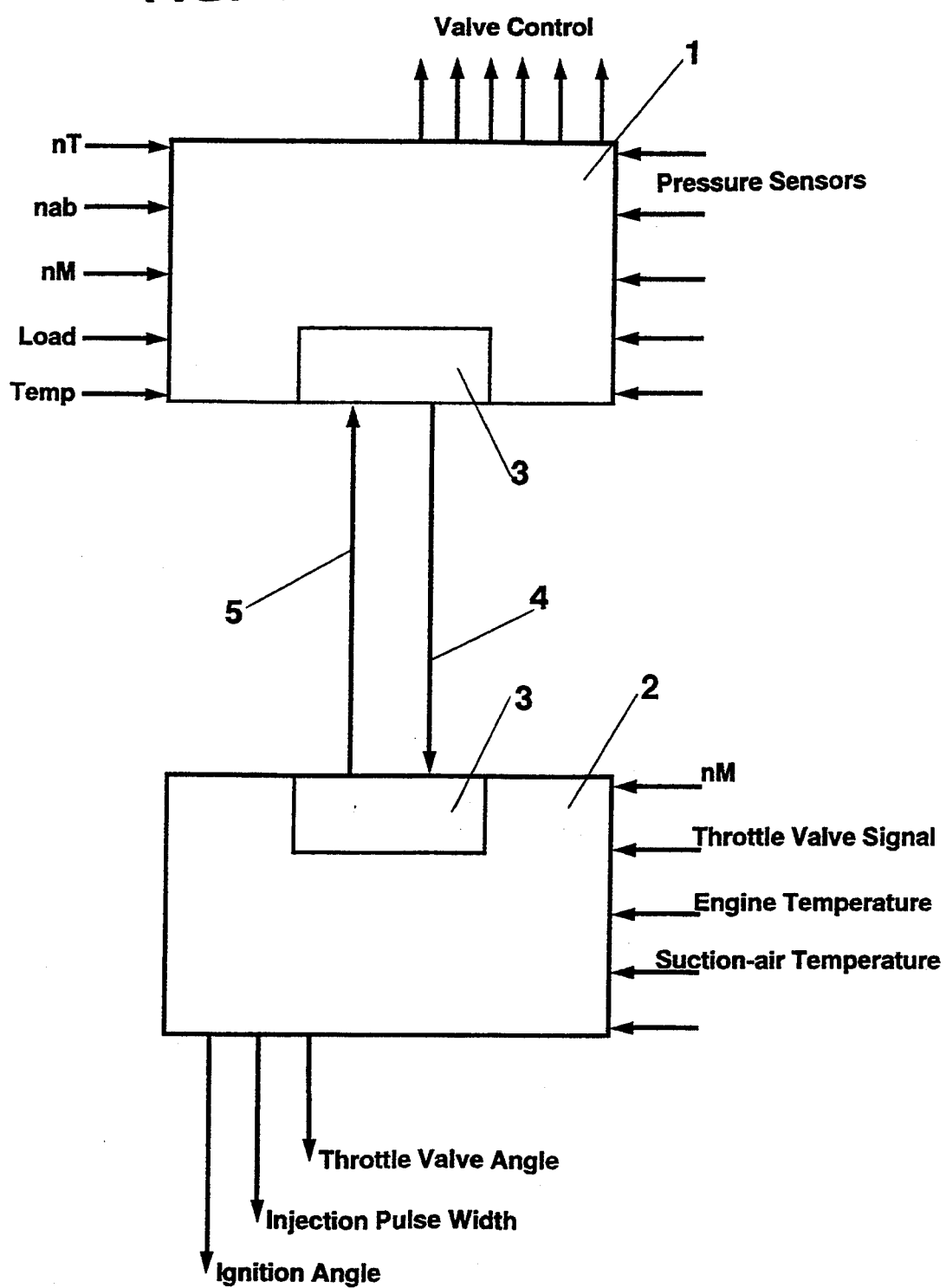
FIG. 1 is a block diagram with a gear control device and a control device for an internal combustion engine.

A gear system control device is designated with 1 in FIG. 1 which, via sensors not shown in detail, detects a turbine speed $n_T$ of a hydrodynamic torque converter, a gear output speed $n_{ab}$, a speed of an internal combustion engine $n_M$, a load signal and a temperature signal of the oil temperature of the gear system. The gear control device has a microprocessor which processes said input data according to pre-determined logical rules and controls shift valves, not shown in detail, of an electro-hydraulic control system of an automatic gear System. Said control valves govern frictionally engaged shift elements of the automatic gear system which are designed as friction clutches or brakes.

From the block diagram it is to be further understood that an engine control device 2 for an internal combustion engine, not shown, drives the automatic gear system. Said control device 2 likewise has a microprocessor to which is fed, via sensors, the following operational parameters of the internal combustion engine: engine speed nM, throttle valve signal, engine temperature and suction-air temperature. The microprocessor processes said input variables according to specific logical rules and, based on said values, corrects a throttle valve angle of a throttle valve situated in the suction-air current, an injection pulse width of a fuel injection system and an ignition angle of an ignition system.

The gear control 1 and the control device 2 of the internal combustion engine have an interface 3. Percentage torque requirements from the gear control device 1 are constantly fed to the control device 2, via said interface 3, by means of a signalling line 4. Via another signalling line 5, information from the control device 2 of the internal combustion engine can be transmitted to the gear control device 1. The control device 2 processes the torque requirements transmitted via the signalling line 4 and, according to the throttle valve angle, affects the injection pulse width or the ignition angle.

Figure 2:
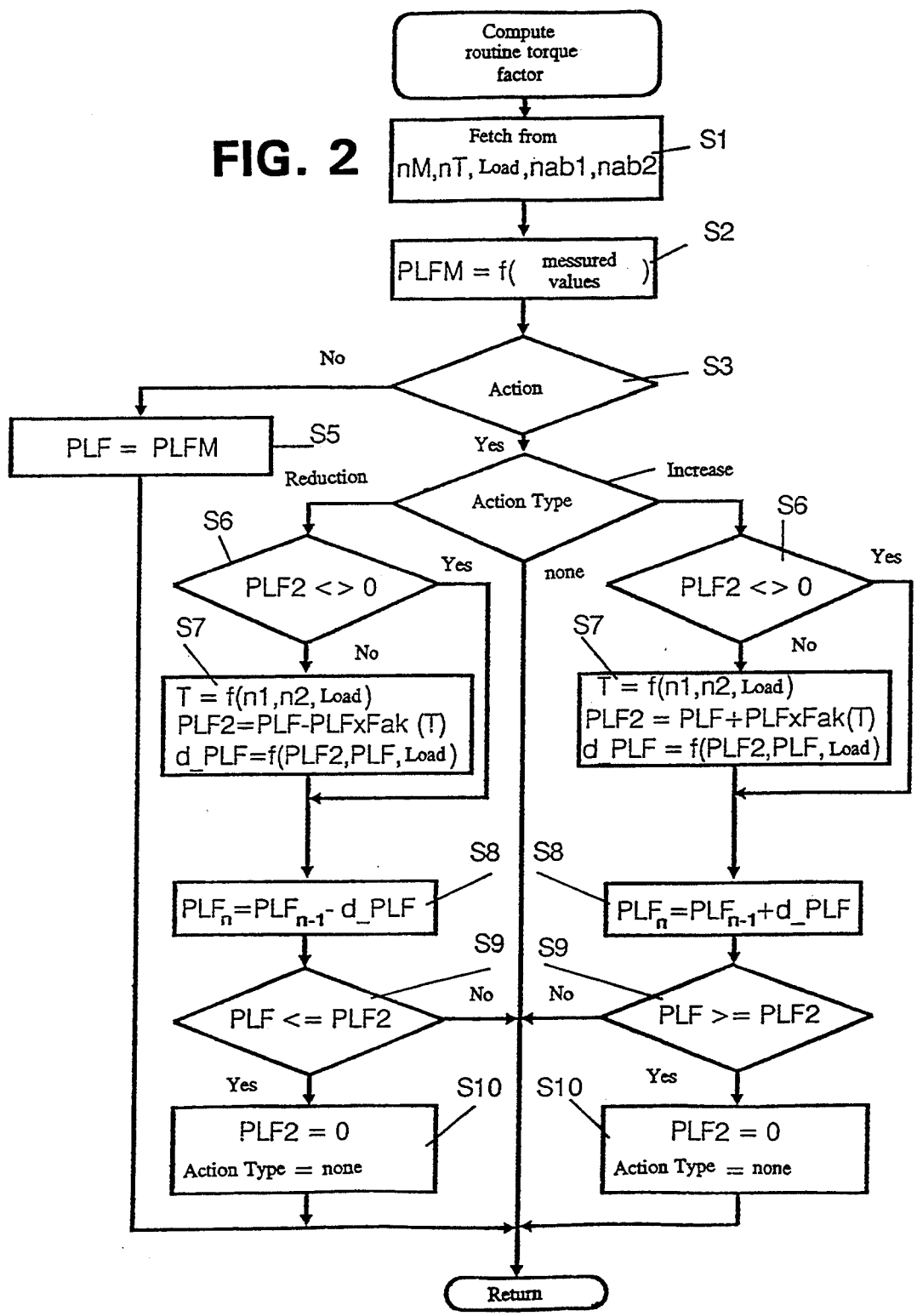
FIG. 2 is a flow diagram for computing a percentage torque factor.

The flow diagram shown in FIG. 2 illustrates a routine for computing a percentage torque factor PLFM. Said routine is cyclically processed according to a program cycle. In step S1, all the measuring values needed for computing the percentage torque requirement are collected. This preferably refers to the speed of the internal combustion engine $n_m$, the speed of the turbine of the torque converter $n_T$, a value of the load requirement adjusted by the driver on the drive pedal, an output speed $n_{ab1}$ of the automatic gear system and an output speed $n_{ab2}$ on the drive wheels of the motor vehicle. In step S2, a percentage torque factor PLFM is then computed according to a specific algorithm as a function of said measured values $n_M$, $n_T$, load, $n_{ab1}$ and $n_{ab2}$.

As already explained with reference to FIG. 1, said computed value is transmitted via the interface 3 from the gear control device 1 to the control device 2 for the internal combustion engine. The beginning of new values is transmitted via an interrupt to the control device 2 of the internal combustion engine. The value in the gear control device 1 is retained until a new value has been computed.

If an action is now identified in step S3, the type of action is scanned in the next step S4. If there is no action, the computed factor is then allocated to the output variable PLF via the corresponding branch step S5.

The type of action, according to step S4, can be a reduction or an increase of the torque requirement. Irrespective of whether the type of action is a reduction or an increase of the torque requirement, the computing steps that follow develop quite identically:

In step S6, whether a set value in the torque requirement PLF2 is still covered with the value 0 is tested. If this is the case, that is, PLF2 is neither less than nor greater than 0, then in consecutive step S7, the set value PLF2 and a gradient $d_{PLF}$, with which the engine torque is to be reduced or increased, must also be determined. In computing the set value of the torque requirement PLF2, a weighing factor (T) is introduced which is generated as a function of the output speeds n1 and n2 of the load. If in step S6, a set value PLF2 is directly present or said set value PLF2 is determined in the successive step S7, then in step S8 the actual torque factor $PLF_n$ is cyclically determined by reducing or increasing the last computed torque value $PLF_{n-1}$ to the set value PLF2 by the addition of the gradient $d_{PLF}$. In the next step S9, whether the $PLF_n$ value is equalized to the set value PLF2 is controlled. In step S10, starting from which the re-entry again takes place, it is indicated by adjusting PLF2=0 and the action type = none that the action type has been shut off and the value reached maintained. If the action is shut off, the value is computed and issued with the measured parameters.

Figure 3:
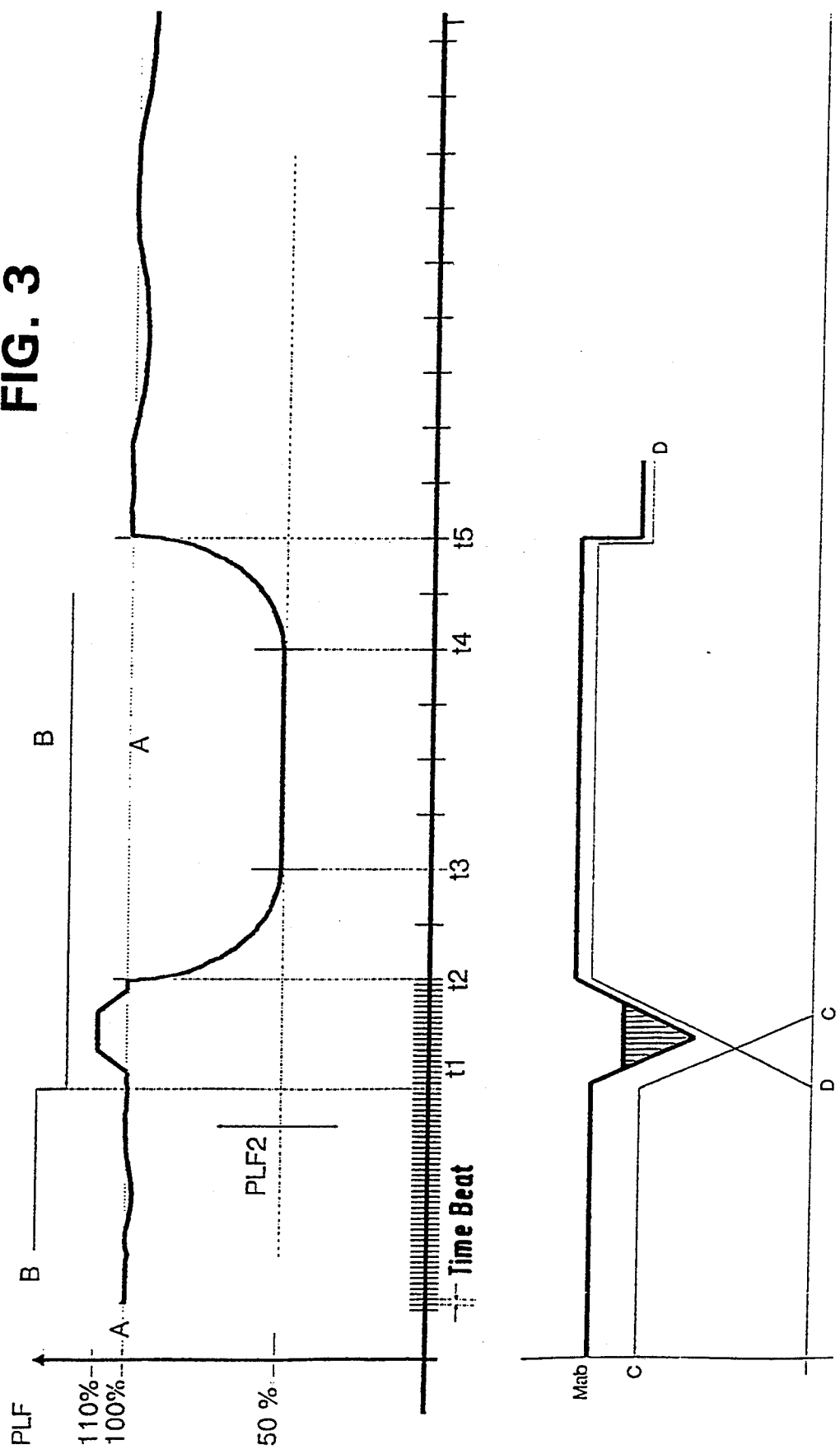
FIG. 3 is a flow diagram of a torque requirement fed during a gearshift to the control device of the internal combustion engine.

FIG. 3 shows, with reference to the contour of a curve, how the torque requirements transmitted to the control device 2 of the internal combustion engine change before, during and after a gear change of the automatic gear system. In this flow diagram, the percentage torque requirement PLF is plotted on the ordinates while the abscissae illustrates a specific time beat T. Line A—A shows the torque requirement PLF transmitted to the control device of the internal combustion engine.

Above said line A—A extends a line B—B with the aid of which is shown a switch signal during one moment t1. In another diagram, situated below the diagram for the torque requirement PLF, is plotted the existing torque $M_{ab}$ which is transmitted by two clutches that take part in a gear change. The curve C—C shows the existing torque of a clutch engaged prior to a gear change. During the gear change, the clutch is disengaged and a second clutch, the torque path of which is shown in the curve D—D, is engaged. In said powershift which leads to an upshift of the automatic gear system to a higher speed level, an overlapping switch takes place during which both clutches are in a grinding engagement. During said grinding period, a power loss appears in the drive train which is compensated during the period of time between the time beats t1 to t2 by a targeted peaking of the torque requirement.

On the basis of the switching activity, the torque requirement transmitted to the control unit of the internal combustion engine is reduced from the time beat t2 to the set value PLF2, according to the curve A—A, said reduction resulting in accordance with the gradient shown by the path of the curve. According to said gradient, between t4 and t5, the set value PLF2 is again peaked to approximately 100%. The torque requirement is constantly transmitted from the gear control to the control of the internal combustion engine so that after the time beat t5, a corresponding path of the line A—A variable by 100% becomes established. The changed torque requirement can also be transmitted by the gear control 1 to the control device 2 of the internal combustion engine when, as a result of slippage of the drive wheels, a drop in torque is registered.

We claim:

1. A method for controlling torque of an internal combustion engine arranged to provide driving power to a motor vehicle via an automatic gear system, said internal combustion engine including an engine control device (2) which, based upon at least speed and load signals received from said internal combustion engine, controlling at least one of an ignition angle of an ignition system and an injection pulse width of a fuel injection system, the automatic gear system having a gear system control device (1) which, based on received speed and load requirement signals, controlling gear changes of the automatic gear system, and a computer system of said gear system control device (1) and a computer system of said engine control device (2) constantly communicating with one another via interfaces (3), wherein said engine control device (2) periodically receives from said gear system control device (1), a percentage torque requirement (PLF) based on which said engine control device (2) automatically influences the torque of the internal combustion engine; said method comprising the steps of:
   detecting with said gear system control device (1) when a change of torque occurs;
   varying the percentage torque requirement (PLF) sent via said interface (3) in accordance with a gradient ($d_{PLF}$); and
   determining said gradient ($d_{PLF}$), as a function of a set end value of a torque requirement (PLF2), a variable factor of the torque requirement (PLF) and a load signal, as follows: $d_{PLF}$=f (PLF2, PLF, load).

2. A method according to claim 1, further comprising the step of, during a change in torque produced by a gear change, generating a variable factor (PLF) of the torque requirement upon one of commencing engagement and commencing disengagement of friction elements participating in a gear change.

3. A method according to claim 1, further comprising the step of, for each variation of a final set value (PLF2)

of the torque requirement, computing a final set value (PLF2), for a specific mode of travel, from a variable factor (PLF) minus a product of the variable factor and a weighing factor (Fak(T)) which is a function of a load requirement and speed ($n_1$, $n_2$), that is: PLF2=PLF−PLF×Fak (T), wherein Fak (T)=f ($n_1$, $n_2$ load).

4. A method according to claim 1, further comprising the step of detecting, with said gear system control device (1), reduced torque requirements which occur as a result of slippage in wheels of the motor vehicle.

5. A method according to claim 2, further comprising the step of, during an overlap in which two friction elements are engaged and result in an increased torque requirement (PLF2), briefly peaking the torque of the internal combustion engine so that a reduction in an output torque ($T_{ab}$), occurring during such overlap, is compensated.

6. A method according to claim 5, further comprising the step of briefly increasing the torque of the internal combustion engine to a value above a maximum torque value (100%) by changing the injection pulse width of the fuel injection system.

7. A method according to claim 1, further comprising the step of detecting, with said gear system control device (1), the percentage torque requirement (PLF) as a first variable and a clutch pressure ($p_K$) of shifting elements, as a second variable, and, based upon the first and second variables (PLF, $p_K$), influencing an output torque ($T_{ab}$) of the gear system and grinding periods ($T_S$) of the shift elements independently of one another.

8. A method according to claim 1, further comprising the step of using a temperature of the internal combustion engine as an input to control the torque of the internal combustion engine.

* * * * *